Figure 1:
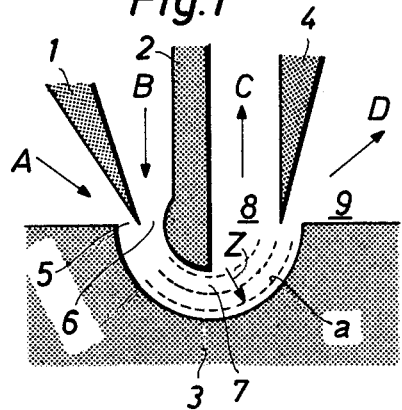

United States Patent [19]
Becker et al.

[11] 3,989,483
[45] Nov. 2, 1976

[54] METHOD AND DEVICE FOR SEPARATING GASEOUS OR VAPOROUS MATERIALS, ESPECIALLY ISOTOPES, BY MEANS OF SEPARATION NOZZLES

[75] Inventors: Erwin Willi Becker, Karlsruhe-Durlach; Wolfgang Ehrfeld, Ettlingen; Gerd Eisenbeiss, Bonn-Holzlar, all of Germany

[73] Assignee: Gesellschaft fur Kernforschung m.b.H., Karlsruhe, Germany

[22] Filed: July 10, 1974

[21] Appl. No.: 487,033

[30] Foreign Application Priority Data
Aug. 1, 1973 Germany............................ 2338893

[52] U.S. Cl....................................... 55/17; 55/392
[51] Int. Cl.².............................................. B01D 59/00
[58] Field of Search................ 55/17, 277, 392–398, 55/431

[56] References Cited
UNITED STATES PATENTS

| | | | |
|---|---|---|---|
| 2,951,554 | 9/1960 | Becker | 55/17 |
| 3,362,131 | 1/1968 | Becker | 55/17 |
| 3,708,964 | 1/1973 | Becker et al. | 55/17 X |
| 3,877,892 | 4/1975 | Bley et al. | 55/17 |

FOREIGN PATENTS OR APPLICATIONS
530,646  7/1931  Germany ................................ 55/17

Primary Examiner—Thomas G. Wyse
Assistant Examiner—Robert H. Spitzer
Attorney, Agent, or Firm—Spencer & Kaye

[57] ABSTRACT

A method is provided for separating gaseous or vaporous substances, especially isotopes, with different molecular weights and/or different gas kinetic cross sections, in which the mixture of substances to be separated is passed through separation nozzles. One of more skimmer diaphragms project into the flow path of the substances and are used to separate and remove fractions of different compositions, and several separation systems consisting of nozzles and skimmer diaphragms are arranged in a cascade. The cascade generates partial streams which contain the mixture of substances to be separated. The partial streams can contain an additional gas with each partial stream containing different fractions of additional gas. When the partial streams generated within the cascade contain different fractions of additional gas, the partial streams are jointly fed to one of the separation nozzle systems in such a way as to generate a molar fraction gradient with respect to the additional gas which is opposed in direction to the molar fraction gradient being generated by the separation process within the nozzle. The partial streams can contain different compositions of the mixture of substances to be separated. When the partial streams generated within the cascade contain different compositions of the mixture of substances to be separated, the partial streams are jointly fed to one of the separation nozzle systems in such a way as to generate a molar fraction ratio with respect to the substances to be separated which is identical in direction with the molar fraction gradient being generated by the separation process within the nozzle.

27 Claims, 13 Drawing Figures

METHOD AND DEVICE FOR SEPARATING GASEOUS OR VAPOROUS MATERIALS, ESPECIALLY ISOTOPES, BY MEANS OF SEPARATION NOZZLES

The present invention relates to methods and devices for separating gaseous or vaporous substances, especially isotopes, with different molecular weights and/or different gas kinetic cross sections in which the mixture of substances to be separated and, if applicable, a lighter additional gas are passed through nozzles whereupon one or several skimmer diaphragms projecting into the flow path of the substances are used to separate and remove fractions of different compositions and in which several separation nozzle systems consisting of nozzles and skimmer diaphragms are connected so as to constitute a cascade.

The principle of the so-called separation nozzle method is know from U.S. Pat. No. 2,951,554. In U.S. Pat. Nos. 3,362,131 and 3,708,964 it is shown how the economy of the method can be improved by adding a lighter gas (auxiliary gas), if necessary, in combination with a deflection of the jet.

In U.S. Pat. No. 2,951,554 it is also suggested that the mixture of substances to be separated and the additional gas be introduced through different chambers existing in the nozzle so that the gas streams would meet and mix before the aperture of the nozzle. It is pointed out that the same principle can be applied to the use of separate nozzles in the proper physical arrangements. It is directly evident that a continuation of separation in a second separation nozzle system connected to the first separation nozzle system is not possible in this variant of the method, because the gas mixture passed to the second system already contains the additional gas. In the embodiment shown in the patent description of repeated separation by the series connection of several separation nozzle systems consisting of nozzles and disphragms as separation stages of a separation cascade there is no separate feeding of the mixture of substances to be separated and the additional gas. The fractions produced in the individual separation stages with different contents of additional gas will be combined in the lines leading to the system; in this way, the nozzles will be fed a physically uniform mixture of the substance to be separated plus additional gas.

In the embodiment of the method according to this example[+] it was recognized that the spaces existing in the separation nozzle systems filled by the gas under the impact of a centrifugal acceleration are used only incompletely to generate separative work with respect to the mixture of substances to be separated for two reasons:

1. because of the relatively marked physical separation of the mixture of substances and the additional gas,
2. because of the absence of a molar fraction gradient of the mixture of substances in the initial areas of the gas flow which would be favorable to the generation of separative work[++].

[+] Atomwirtschaft 13, 359 (1968).
[++] see K. Cohen, Theory of Isotope Separation as Applied to the Large Scale Production of U-235, McGraw Hill, New York, 1951.

The present invention serves the purpose of highlighting possibilities of utilizing for the separation process more than before the spaces of the separation nozzle systems filled with centrifugal acceleration. For this purpose, two measures are suggested which can be applied both separately and in combination whith each other.

In one measure according to the present invention the partial streams generated in the cascade with different fractions of additional gas should be fed into the separation nozzle systems in such a way that a molar fraction gradient is produced with respect to the additional gas which counteracts the molar fraction gradient generated by the separation process.

The other measure according to the present invention is a proposal to feed the partial streams generated within the cascade, with different compositions of the mixture of substances to be separated, into the separation nozzle systems in such a way that a molar fraction gradient is produced with respect to the materials to be separated which acts in the same direction as the molar fraction gradient generated by the separation process.

The two measures can greatly increase the separative work output at a given amount of investment capital and operating expenditure because of a more favorable physical distribution of substances in the separation nozzle systems, which improves the economy of the process by a corresponding margin.

It is advantageous to introduce the mixture of substances to be separated and the additional gas, e.g., in such a way that partial streams containing a higher fraction of additional gas and/or a higher fraction of heavy components of the mixture of substances to be separated are preferably fed to those areas of the separation nozzle systems which are located on the outside as seen in the direction of the centrifugal forces occurring in the separation nozzle systems.

In a preferred advancement of the present invention it is suggested with respect to the physical distribution of the substances to previously deflect the partial stream with the lower content of additional gas and/or the lower fraction of the heavier component of the mixture of substances to be separated before combining it with the partial stream having a higher content of additional gas and/or a larger fraction of the heavier component of the mixture of substances to be separated.

The present invention can be applied both to separation nozzle systems in which the curvature of the flow lines necessary for demixing is achieved mainly by a deflection of the gas stream of a solid wall and to those in which it is generated mainly by an expansion of the process gas.

It may be particularly advantageous to use the partial streams with a higher fraction of additional gas and/or a higher fraction of the heavier component of the mixture of substances to be separated to deflect, in the interior of the separation nozzle systems, the flows of the partial streams introduced into the separation nozzle systems with a lower fraction of additional gas and/or a lower fraction of the heavier components of the mixture of substances to be separated. In this way, both the required curvature of the flow lines and the desired molar fraction gradient can be produced.

In a preferred embodiment the partial streams deflected with a lower fraction of additional gas and/or a lower fraction of the heavier component of the mixture of substances to be separated are partial streams of a corresponding composition which leave separation nozzles series connected upstream, the kinetic energy contained in these partial streams also being used for separation purposes.

In implementing the method according to the present invention the partial streams which are most favorable in the initial areas of the gas flow for the generation of an optimum molecular fraction gradient with respect to the additional gas can generally be produced in cascade arrangements which can simply be derived from the cascade circuits customarily used in three-pole separation systems[++]. The optimum molar fraction ratio for the generation of separative work with respect to the mixture of substances to be separated and the partial streams of the required composition, respectively, in general cannot be realized by means of cascade arrangements that simple, if major mixing losses and/or undesired transport of material in the cascade are to be avoided.

[++] see K. Cohen, Theory of Isotope Separation as Applied to the Large Scale Production of U-235, McGraw Hill, New York, 1951.

This difficulty can be avoided in the invention in a surprisingly simple way by generating the partial streams introduced into the separation nozzle systems by splitting up fractions generated in the cascade, i.e., a partial stream generated in the cascade is not completely fed to one single cascade separation stage but split up and passed on to various separation stages. The sub-partial streams produced in this way, which may be called enriched or depleted with respect to the heavier component of the mixture of substances to be separated, depending upon the stage considered, can be varied with respect to their flow intensity in such a way that no major mixing losses are generated and/or the equilibrium conditions required for the cascade are not disturbed.

Another particularly advantageous possibility of generating partial streams for an optimum molar fraction ratio is based on the fact that there is not simply a split into two fractions in the separation nozzle system (three-pole separation system, see above) but that the gas stream is split up into at least three fractions already in the interior of the separation nozzle system after separation has taken place. In this way, much finer grading of concentrations in the discharged fractions is possible, which allows an optimum adjustment of the molar fractions to be made in the partial streams for the individual separation nozzle systems in one cascade. In addition, the separative work output generated in the separation process is utilized more efficiently.

Further details of the present invention are explained by way of example in greater detail on the basis of the drawings:

FIGS. 1 to 9 schematically show sections of various embodiments of separation nozzle systems which can be used to implement the methods according of the present invention, FIGS. 10 to 13 show principal diagrams of cascade arrangements in which separation nozzle system according to the present invention can be used.

The separation nozzle system as shown in FIG. 1 mainly consists of an inlet partition wall 1 attached to the nozzle inlet, a nozzle wall 2, a deflection wall 3 and a skimmer diaphragm 4. The partition wall 1 together with the deflection wall 3 and the nozzle wall 2, respectively, constitutes two slotted nozzles 5 and 6, respectively, through which the partial streams A and B enter the common interior 7 of the separation nozzle system which is formed essentially by the curved area of the deflection wall 3 and the free end of the nozzle wall 2. The skimmer diaphragm 4 produces two skimmer channels 8 and 9 through which the fractions C and D are removed.

If this separation nozzle system is operated in the usual way without an inlet partition wall 1, the centrifugal forces Z schematically indicated, which are generated by the curvature of the flow lines a, give rise to a molar fraction gradient in such a way that the heavier materials are enriched close to the deflection wall 3, whereas the molar fraction of the additional gas greatly decreases in the direction of the centrifugal forces Z. If the flow velocity is increased, the zone of high density of the materials to be separated continues to be shifted towards the deflection wall 3. In this way, the interior 7 of the separation nozzle system is utilized only incompletely for the generation of separative work.

If however, the separation nozzle system is operated according to the present invention with the inlet partition wall 1 by using a partial stream A with a higher fraction of additional gas and a partial stream B with a lower fraction of additional gas from the cascade, a molar fraction gradient is produced with respect to the additional gas at the nozzle inlet which is opposed in direction to the molar fraction gradient produced by the separation process. In this mode of operation the partial stream A with a higher fraction of light additional gas will be fed to those areas of the separation nozzle system which are on the outside in the direction of the centrifugal forces occurring in the separation nozzle system. In this way, the tendency of a physical separation of the mixture of materials and the additional gas is being counteracted, i.e., it is prevented that only a narrow zone of high density of the substances to be separated is produced at the deflection wall. This makes a better use of the interior 7 of the separation nozzle system and increases the separative work output.

The interior available for separation can be used more efficiently also if a larger fraction of heavier substances of the mixture to be separated is added to partial stream A than to partial stream B, i.e. if a molar fraction gradient is generated at the nozzle inlet with respect to the heavy component which moves in the same direction as that to be generated in the separation chamber.

If a separation nozzle system according to FIG. 1 is used to separate the uranium isotopes U-235 and U-238, e.g., the following geometry and operating parameters may be set up: radius of the deflection wall 0.1 mm; width of nozzle slot 0.02 mm, pressure of the mixture 300 Torr; expansion ratio 2 : 1 to 4 : 1; mean composition of the mixture 5 mol % $UF_6$, the balance being hydrogen or helium.

Figure 2:
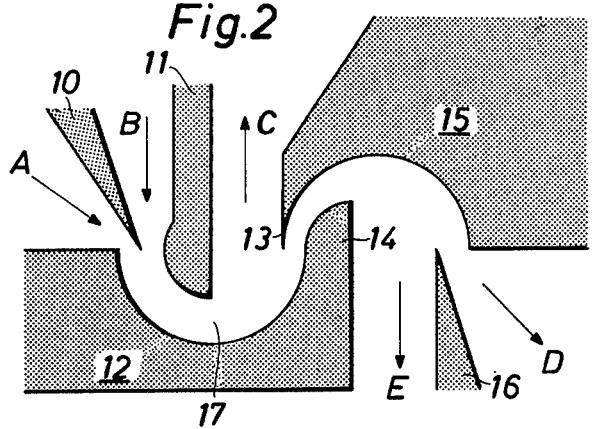

FIG. 2 shows another example of a separation nozzle system in which, as in FIG. 1, the curvature of the flow lines necessary for demixing is achieved by deflecting a gas stream at a curved area of a fixed wall 12. In this case, a first separation nozzle subsystem consisting of an inlet partition wall 10, a nozzle wall 11, a deflection wall 12, and a skimmer diaphragm 13 is followed by another separation nozzle subsystem consisting of a nozzle wall 14, a deflection wall 15 and skimmer diaphragm 16 in such a way that the deflection wall 12 is continued in a nozzle wall 14 and a skimmer diaphragm 13 in a deflection wall 15 of the second separation nozzle subsystem. In the second separation nozzle subsystem the separation process for a fraction generated in the first subsystem is continued. Separate feeding of the partial streams A and B makes more efficient use of the interior 17 of the first subsystem, as in the example of FIG. 1. However, the separative work produced in the second subsystem is also increased because separate feeding as in the first subsystem also results in a concentration distribution of the substances to be separated and the additional gas, respectively, more favorable to separation and/or more favorable flow conditions in the second subsystem.

Figure 3:
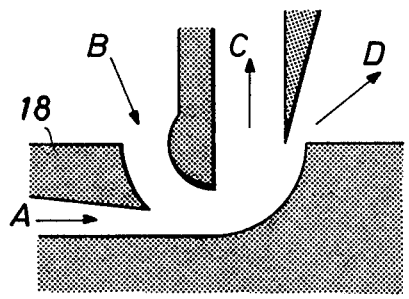

FIG. 3 shows an example of a separation nozzle system in which the partial stream A after initial deflection of the partial stream B, e.g., by a deflection angle of approximately 90°, is fed to the interior of the separation nozzle system. The inlet partition wall 18, which separates the partial streams A and B of different compositions, accordingly has a deflection area at its end close to the nozzle inlet which is used for initial deflection of the partial stream B.

Figure 4:
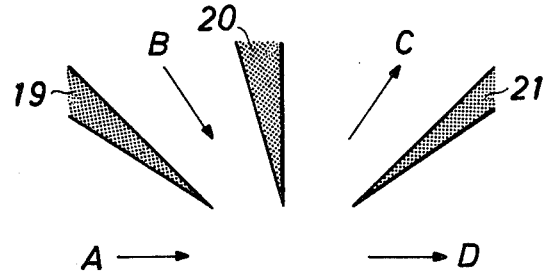

FIG. 4 shows an example of a separation nozzle system consisting of the inlet partition walls 19, the nozzle walls 20 and the skimmer diaphragm 21 in which two external partial streams B are deflected by a central partial stream A with a higher content of additional gas and/or the heavier component of the mixture of substances to be separated and in which the flow is split up into the fractions C and D after the separation process. For this purpose two nozzles constituted by the nozzle walls 20 and the inlet partition walls 19 for the partial streams B are arranged in mirror symmetry relative to the axis and the bisector of the central nozzle constituted by the inlet flow partition walls 19, respectively, for the partial stream A. Downstream of the nozzle walls 20 two skimmer diaphragms 21 are installed in mirror symmetry relative to the axis of the central nozzle. In contrast to the separation nozzle systems as shown in FIGS. 1 – 3 there is no fixed wall in this case for flow deflection; instead, flow deflection is produced by mutual beam deflection.

Figure 5:
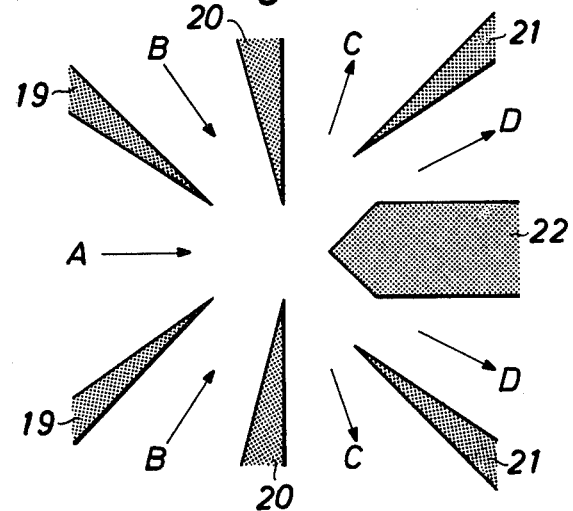

FIG. 5 shows an example of a separation nozzle system in which an additional baffle barrier 22 is installed between the skimmer diaphragm 21 in order to enlarge the angle of deflection of the flow as against the arrangement shown in FIG. 4.

Figure 6:
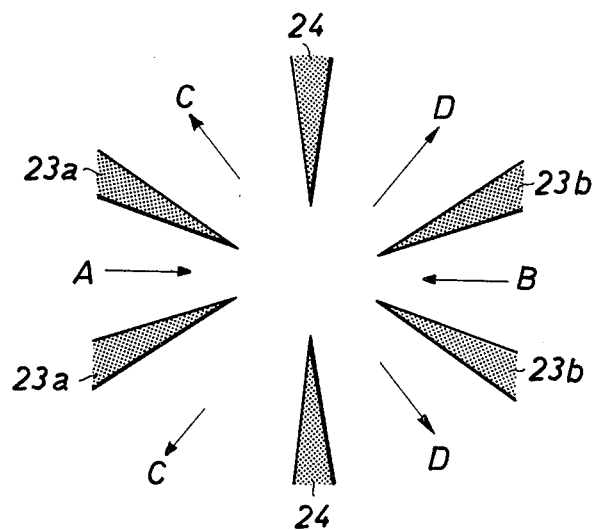

FIG. 6 shows an example of a separation nozzle system consisting of nozzle walls 23a and 23b and skimmer diaphragms 24 in which the partial streams A and B flow frontally against each other in order to amplify the deflection effect and in which the flow is split up into the fractions C and D after the separation process. Also this system is designed in mirror symmetry relative to the axis of the nozzles for the partial streams A and B.

Figure 7:
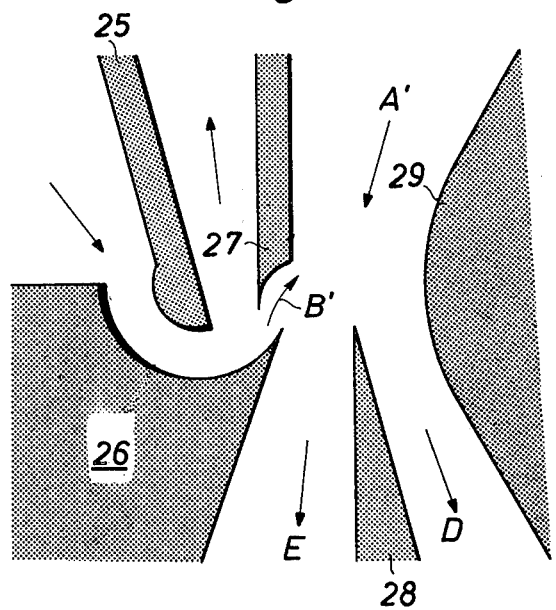

FIG. 7 shows an example of a separation nozzle system in which the partial stream to be deflected with a lower fraction of additional gas and/or a lower fraction of the heavier component of the mixture of substances to be separated is a partial jet B' leaving a separation nozzle system series connected immediately upstream which, in this case, consists of a nozzle wall 25, a deflection wall 26 and a skimmer diaphragm 27. The partial jet B' is deflected in the second separation nozzle system series connected immediately downstream by the partial stream A' with a higher fraction of additional gas and/or a higher fraction of the heavier component of the mixture to be separated, whereupon the flow consisting of the partial streams A' and B' is split up in the second separation nozzle system into the fractions E and D by the skimmer diaphragm 28 after the separation process proper. The skimmer diaphragm 27 of the upstream separation nozzle system and a guide wall 29 constitute a nozzle for the deflecting partial stream A'.

Figure 8:
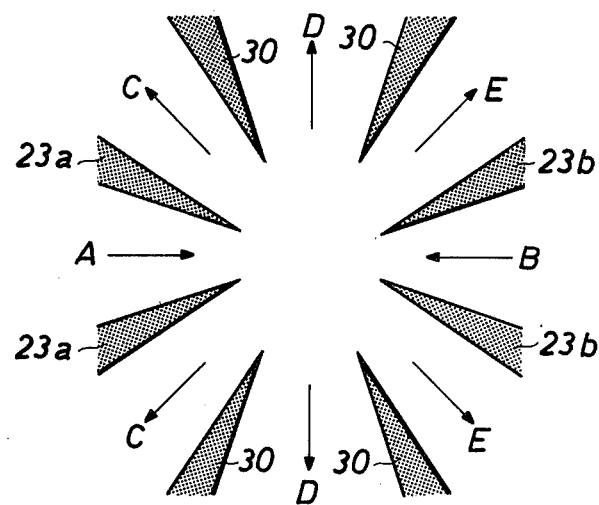

FIG. 8 shows an example of a separation nozzle system in which a multiple split-up into the three fractions C, D and E of the gas stream consisting of the initial partial streams A, B is performed by the installation of additional skimmer diaphragms 30 after the separation step. The example shown in FIG. 8 has been developed out of the embodiment shown in FIG. 6 in which there was only one split-up into the fractions C and D. The respective separation nozzle systems with multiple splitting can be derived also from the separation nozzle systems shown in the other figures by the addition of additional skimmer diaphragms.

Figure 9:
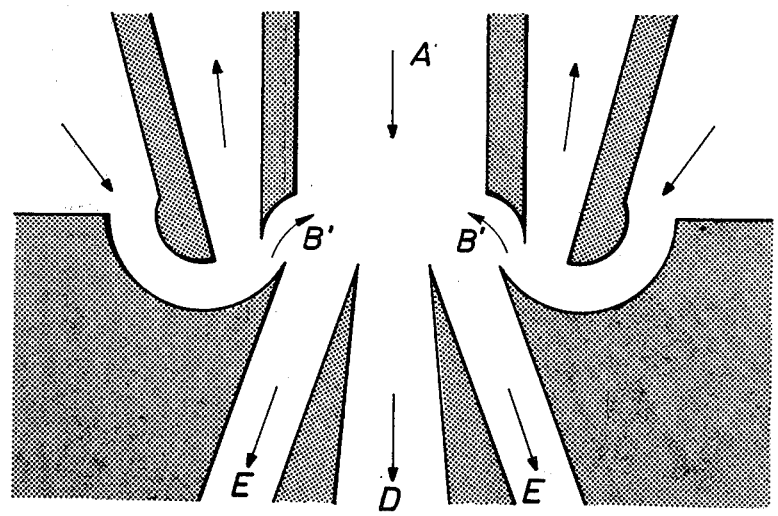

The single separation nozzle systems shown in the drawings above can generally be extended so as to constitute mirror symmetrical or point symmetrical arrangements according to FIG. 9. On the one hand, this offers the advantage of a more compact separation element unit in which at least one part of the fractions D to be removed and/or the partial streams A' to be supplied can be combined in common skimmer channels and/or partial stream nozzles. Secondly, mutual beam deflection in a symmetrical structure will reduce flow losses and enhance deflection.

The basic idea according to the present invention of the combination of various partial streams in the separation element in general is maintained throughout the embodiments shown here even if a major or minor number of partial streams are added to the separation nozzle system and removed from the separation nozzle system, respectively. Moreover, it is possible to establish different inlet pressures and/or temperatures in the inlet section and different suction pressures for removal from the separation nozzle system for each partial stream.

Figure 10:
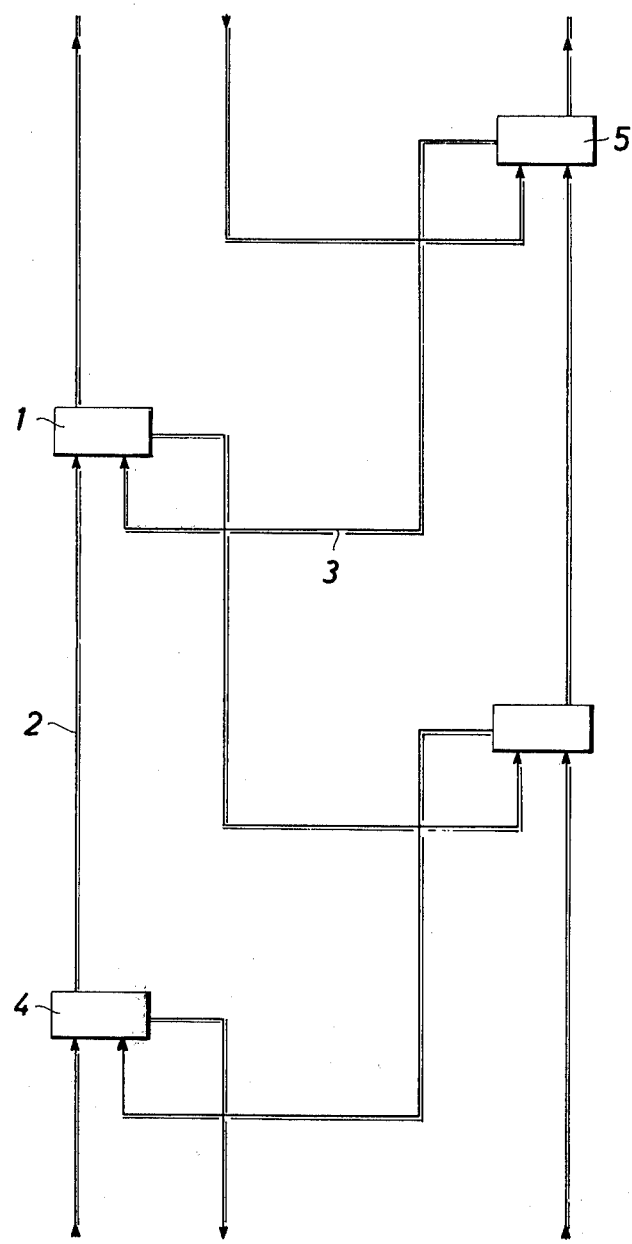

In the following drawings examples of the combination to a separation cascade of separation nozzle systems according to the present invention are shown:

FIG. 10 shows a section of a cascade in which two partial streams 2 and 3 can be separately fed into a separation stage 1, the two partial streams having different concentrations of additional gas, but no different composition of the mixture of substances to be separated. The partial stream 2 as the fraction rich in additional gas is generated in the second next lower stage 4, the partial stream 3 as the fraction containing a small amount of additional gas being generated in the next higher stage 5.

Figure 11:
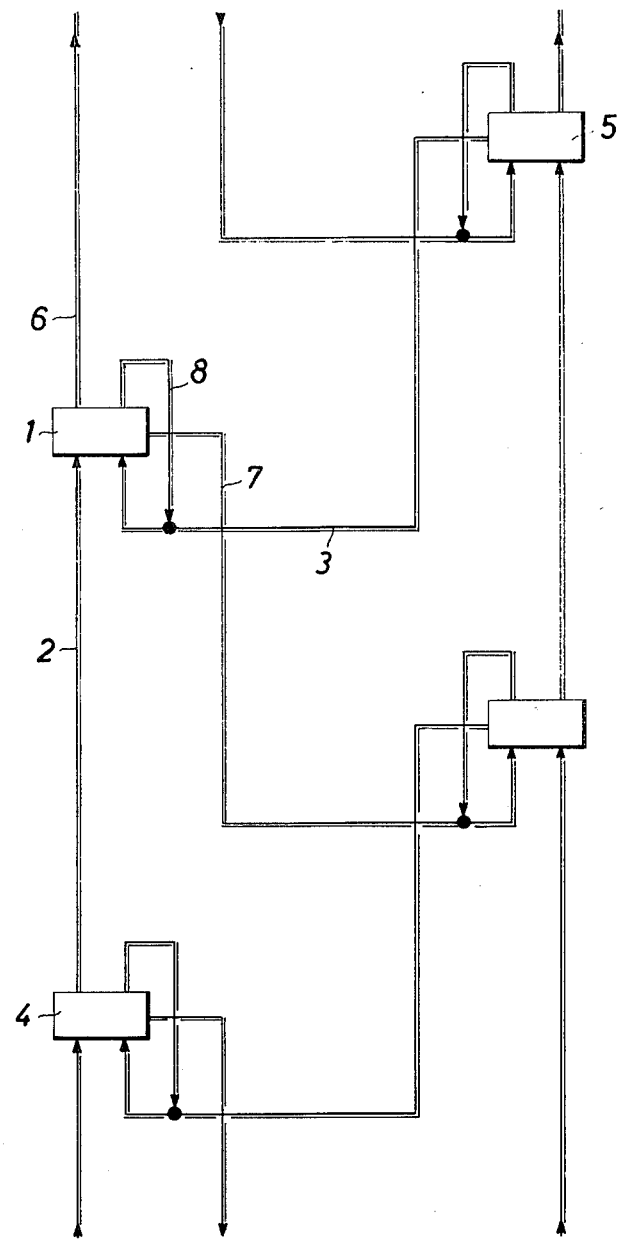

FIG. 11 shows a section of a cascade in which three fractions 6, 7, 8 are removed from a separation stage 1. The fraction 8 having an intermediate concentration level is fed to that point in a cascade at which the composition with respect to the mixture of substances to be separated shows the least amount of difference. In FIG. 11 one example shows the recycling of the fraction 8 upstream ahead of the same separation stage 1 and its mixing with the partial jet 3.

Figure 12:
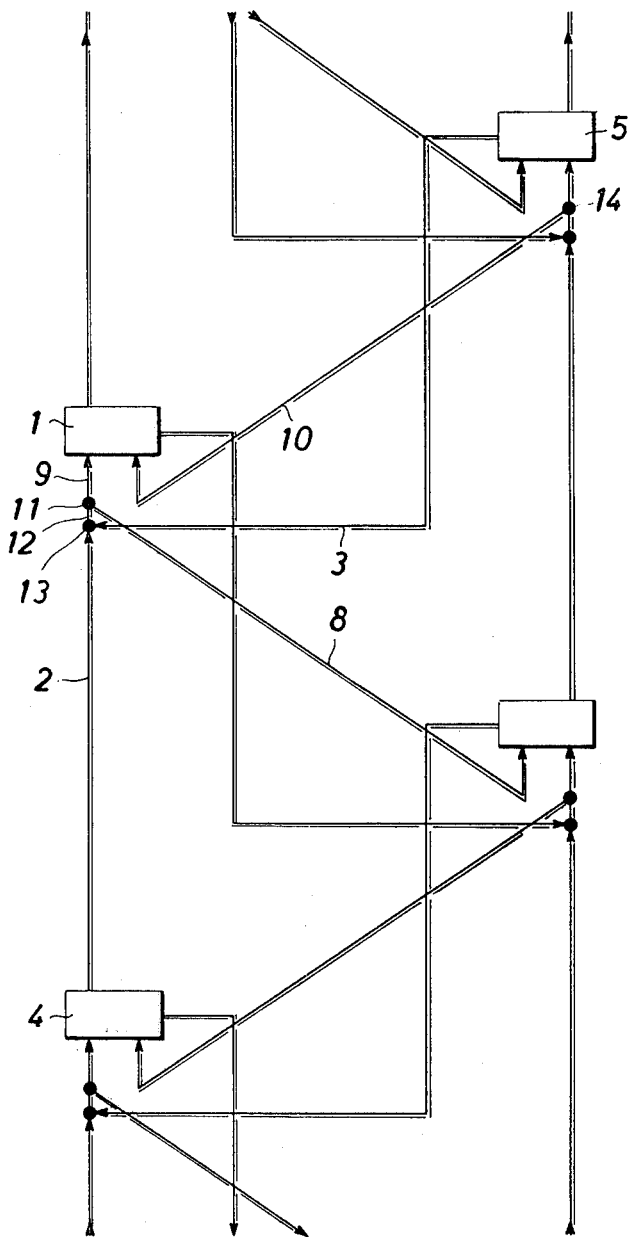

FIG. 12 shows a section of a cascade in which two partial streams 9 and 10 can separately be fed to a separation stage 1, the partial streams differing in composition with respect to the mixture of substances to be separated, but not in terms of their additional gas concentration. The partial stream 9 is split off the stream 12 at 11, which stream 12 is generated at 13 by mixing a fraction with a low amount of additional gas 3 and a fraction with a high amount of additional gas 2 which, in turn, are generated at 5 and 4, respectively. The second fraction 10 added is deviated at the next higher stage 5 at 14, corresponding to the split-up at 11 upstream of stage 1.

This arrangement can be applied also to separation nozzle systems run without an additional gas.

Figure 13:
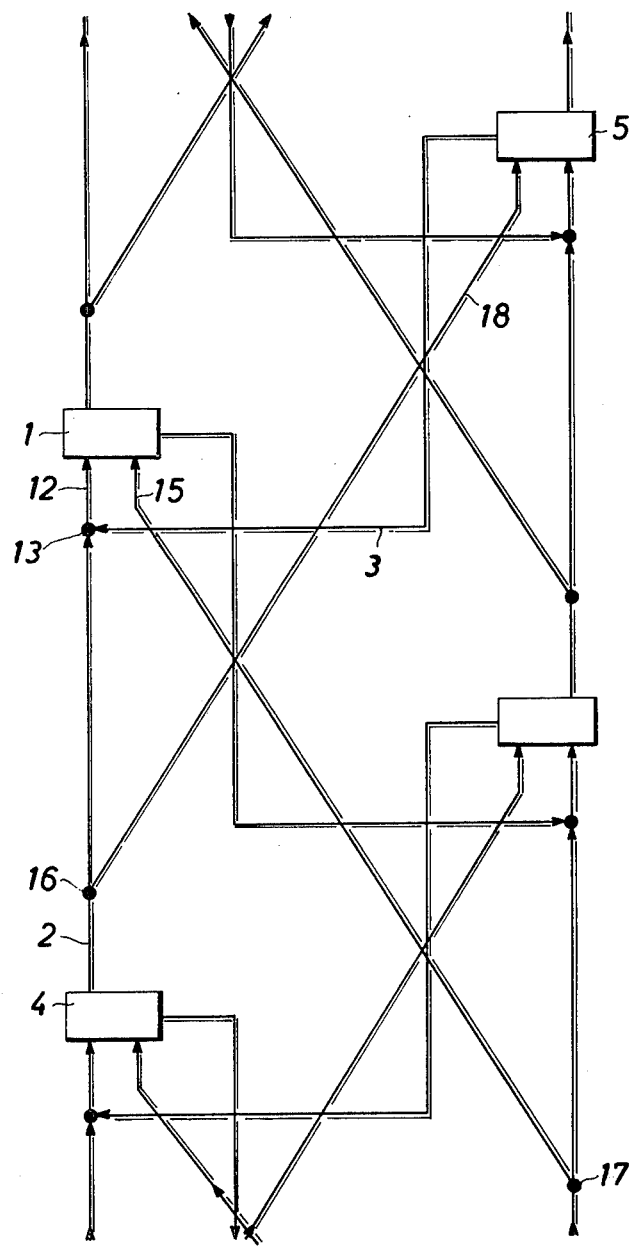

FIG. 13 shows a section of a cascade in which two partial streams 12 and 15 can separately be fed to a separation stage 1, which partial streams differ in composition with respect to the mixture of substances to be separated and in their concentration of additional gas. The partial stream 12 is produced at 13 by mixing a fraction 3 containing a low amount of additional gas and a part deflected at 16 of the fraction 2 containing a large amount of additional gas, which are generated at 5 and 4, respectively. The second partial stream 15 added is produced by splitting up the fraction rich in additional gas of the third next lower stage at 17. In the same way, the stream 18 remaining after the split-up 16 constitutes a partial stream fed to the separation stage 5.

Cascade arrangements according to the present invention include those in which a larger or smaller number of stages than were selected for the examples in FIGS. 10 to 13 are being bridged by the individual fractions and partial streams, respectively, the flow splitting conditions in the separation stages being adapted accordingly.

What we claim is:

1. Method of separating gaseous or vaporous substances, especially isotopes, with different molecular weights and/or different gas kinetic cross sections, in which the mixture of substances to be separated and a lighter additional gas are passed through separation nozzles, whereupon one or more skimmer diaphragms projecting into the flow path of said substances are used to separate and remove fractions of different compositions, and in which several separation nozzle systems, each containing a nozzle and skimmer diaphragm, are arranged in a cascade, comprising the step of jointly feeding partial streams generated within the cascade with different fractions of additional gas to one of the separation nozzle systems in such a way as to generate a molar fraction gradient with respect to the additional gas which is opposed in direction to the molar fraction gradient being generated by the separation process within the nozzle, said partial streams comprising a first partial stream and a second partial stream, with said first partial stream having a higher content of additional gas than said second partial stream.

2. Method as claimed in claim 1, wherein the partial stream having a higher content of additional gas is introduced to said one separation nozzle system in those areas of said one separation nozzle system which are on the outside in the sense of direction of the centrifugal forces occurring in said one separation nozzle system.

3. Method as claimed in claim 2, wherein said partial stream having lower content of additional gas is deflected before being combined with said partial stream having a higher content of additional gas.

4. Method as claimed in claim 3, wherein the partial stream with a higher content of additional gas is used to deflect in the interior of said one separation nozzle system the flow of said deflected partial stream introduced into said one separation nozzle system with a lower content of additional gas.

5. Method as claimed in claim 2, wherein the partial stream with a higher content of additional gas is used to deflect in the interior of said one separation nozzle system the flow of at least one partial stream introduced into said one separation nozzle system with a lower content of additional gas.

6. Method as claimed in claim 5, wherein a jet of the proper composition as released from a second separation nozzle system connected directly upstream is used as the partial stream to be deflected with a lower content of additional gas.

7. Method as claimed in claim 5, wherein the partial stream with a higher content of additional gas deflects, in the interior of said one separation nozzle system, two partial streams having a lower content of additional gas.

8. Method as claimed in claim 2, wherein the partial streams fed into said one separation nozzle system are generated by splitting up the fractions produced in the cascade.

9. Method as claimed in claim 2, wherein the partial streams form a gas stream in the interior of said one separation nozzle system and the gas stream is split into at least three fractions in the interior of said one separation nozzle system after the separation event.

10. Method as claimed in claim 1, wherein said first and second partial streams have different compositions of the mixture of substances to be separated, the first partial stream has a higher content of heavier components to be separated than the second partial stream, and the partial streams are jointly fed in such a way as to generate a molar fraction ratio with respect to the substances to be separated which is identical in direction with the molar fraction gradient being generated by the separation process within the nozzle.

11. Method of separating gaseous or vaporous substances, especially isotopes, with different molecular weights and/or different gas kinetic cross sections, in which the mixture of substances to be separated is passed through separation nozzles, whereupon one or more skimmer diaphragms projecting into the flow path of said substances are used to separate and remove fractions of different compositions, and in which several separation nozzle systems, each containing a nozzle and skimmer diaphragm, are connected in one cascade, comprising the step of jointly feeding partial streams generated within the cascade with different compositions of the mixture of substances to be separated to one of the separation nozzle systems in such a way as to generate a molar fraction ratio with respect to the substances to be separated which is identical in direction with the molar fraction gradient being generated by the separation process within the nozzle, said partial streams comprising a first partial stream and a second partial stream with the first partial stream having a higher content of heavier components to be separated than the second partial stream.

12. Method as claimed in claim 11, wherein the partial stream having a higher content of heavier components is introduced to said one separation nozzle system in those areas of said one separation nozzle system which are on the outside in the sense of direction of the centrifugal forces occurring in the separation nozzle system.

13. Method as claimed in claim 12, wherein the partial stream having a lower content of heavier components is deflected before being combined with said partial stream having a higher content of heavier components.

14. Method as claimed in claim 12, wherein the partial stream with a higher content of heavier components is used to deflect in the interior of said one separation nozzle system the flow of at least one partial stream introduced into said one separation nozzle system with a lower content of heavier components.

15. Method as claimed in claim 14, wherein a jet of the proper composition as released from a second separation nozzle system connected directly upstream is used as the partial stream to be deflected with a lower content of heavier components.

16. Method as claimed in claim 13, wherein the partial stream with a higher content of heavier components is used to deflect in the interior of said one separation nozzle system the flow of said deflected partial stream introduced into said one separation nozzle system with a lower content of heavier components.

17. Method as claimed in claim 14, wherein the partial stream with a higher content of heavier components deflects, in the interior of said one separation nozzle system, two partial streams having a lower content of heavier components.

18. Method as claimed in claim 12, wherein the partial streams fed into said one separation nozzle system are generated by splitting up the fractions produced in the cascade.

19. Method as claimed in claim 12, wherein the partial streams form a gas stream in the interior of said one separation nozzle system and the gas stream is split into at least three fractions in the interior of said one separation nozzle system after the separation event.

20. In an apparatus for separating gaseous or vaporous substances, especially isotopes, with different molecular weights and/or different gas kinetic cross sections, in which the mixture of substances to be separated is passed through separation nozzles, whereupon one or more skimmer diaphragms projecting into the flow path of said substances are used to separate and remove fractions of different compositions, and in which several separation nozzle systems, each containing at least one nozzle and at least one skimmer diaphragm, are arranged in a cascade, and in which partial streams generated within the cascade gas are jointly fed to one of the separation nozzle systems, said cascade comprising
 a. at least four separation nozzle systems of which each is part of an enrichment stage;
 b. at least one of said four systems has two inlet lines and two outlet lines;
 c. one of said inlet lines leads to the second closest lowermost system and is supplied by said second closest lowermost system with a first partial stream;
 d. the other of said inlet lines leads to the next higher of said systems and is supplied by it with a second partial stream;
 e. said inlet lines being separated from one another up to the nozzle entrance of the separation nozzle system they enter, said separation nozzle system they enter comprising a nozzle containing a nozzle inlet and at least one inlet stream partition wall arranged at the nozzle inlet and forming said nozzle inlet into two slotted nozzle inlets, with one of said inlet lines being connected to one of said slotted nozzle inlets and the other of said inlet lines being connected to the other of said slotted nozzle inlets.

21. The apparatus as claimed in claim 20 wherein said at least one system comprises a first separation nozzle subsystem and a series connected second separation nozzle subsystem, said first separation nozzle subsystem containing said inlet stream partition wall, a nozzle wall, a deflection wall and a skimmer diaphragm; said series connected second separation nozzle subsystem immediately follows said first separation nozzle subsystem for continuing the separation process for a fraction produced in said first subsystem, said second separation nozzle subsystem containing a nozzle wall which is a continuation of the deflection wall of the first separation nozzle subsystem, and further containing a deflection wall which is a continuation of the skimmer diaphragm of the first separation nozzle subsystem.

22. The apparatus as claimed in claim 20 wherein the inlet stream partition wall has a deflection area at its end butting against the nozzle inlet for intial deflection of one of said first and second partial streams.

23. In an apparatus for separating gaseous or vaporous substances, especially isotopes, with different molecular weights and/or different gas kinetic cross sections, in which the mixture of substances to be separated is passed through separation nozzles, whereupon one or more skimmer diaphragms projecting into the flow path of said substances are used to separate and remove fractions of different compositions, and in which several separation nozzle systems, each containing at least one nozzle and at least one skimmer diaphragm, are arranged in a cascade, and in which partial streams generated within the cascade are jointly fed to one of the separation nozzle systems, the improvement wherein said one separation nozzle system comprises two outer nozzles, each of which receives a partial stream, and a central nozzle for a further partial stream, said central nozzle being constituted by two inlet stream partition walls, said two outer nozzles being arranged in mirror symmetry relative to the axis of the central nozzle, with each of said two nozzles being constituted by one of said inlet stream partition walls and a nozzle wall, and at least two skimmer diaphragms installed downstream of the nozzle walls in mirror symmetry relative to the axis of the central nozzle.

24. The apparatus as claimed in claim 23 wherein a baffle barrier is additionally installed between said two skimmer diaphragms.

25. In an apparatus for separating gaseous or vaporous substances, especially isotopes, with different molecular weights and/or different gas kinetic cross sections, in which the mixture of substances to be separated is passed through separation nozzles, whereupon one or more skimmer diaphramgs projecting into the flow path of said substances are used to separate and remove fractions of different compositions, and in which several separation nozzle systems, each containing at least one nozzle and at least one skimmer diaphragm, are arranged in a cascade, and in which partial streams generated within the cascade are jointly fed to one of the separation nozzle systems, the improvement wherein said one separation nozzle system comprises first and second nozzles for first and second partial streams, said first and second nozzles face each other frontally, and the skimmer diaphragms are arranged in mirror symmetry relative to the axis of the nozzles.

26. In an apparatus for separating gaseous or vaporous substances, especially isotopes, with different molecular weights and/or different gas kinetic cross sections, in which the mixture of substances to be separated is passed through separation nozzles, whereupon one or more skimmer diaphragms projecting into the flow path of said substances are used to separate and remove fractions of different compositions, and in which several separation nozzle systems, each containing a nozzle and skimmer diaphragm, are arranged in a cascade, and in which partial streams generated within the cascade are jointly fed to one of the separation nozzle systems the improvement wherein a second separation nozzle system is connected directly upstream of said one separation nozzle system and releases a jet which is used as a first partial stream to be deflected with a second partial stream entering said one separation nozzle system, the nozzle for the deflecting second partial stream being constituted by a skimmer diaphragm of the upstream separation nozzle system and a guide wall, and a skimmer diaphragm splits up the gas stream formed by the first and second partial streams into two different fractions.

27. In an apparatus for separating gaseous or vaporous substances, especially isotopes, with different molecular weights and/or different gas kinetic cross sections, in which the mixture of substances to be separated is passed through separation nozzles, whereupon one or more skimmer diaphragms projecting into the flow path of said substances are used to separate and remove fractions of different compositions, and in which several separation nozzle systems, each containing a nozzle and skimmer diaphragm, are connected in one cascade, and in which partial streams generated within the cascade are jointly fed to one of the separation nozzle systems, the improvement wherein several single separation nozzle systems are extended into point or mirror symmetrical arrangements and at least some of the fractions to be removed and/or the partial streams to be fed in, are combined in joint skimmer channels and/or partial stream nozzles.

* * * * *